United States Patent
Seidner

(10) Patent No.: US 8,924,899 B2
(45) Date of Patent: Dec. 30, 2014

(54) SYSTEM AND METHOD FOR UNIVERSAL CONTROL OF ELECTRONIC DEVICES

(71) Applicant: Daniel Jakob Seidner, Los Angeles, CA (US)

(72) Inventor: Daniel Jakob Seidner, Los Angeles, CA (US)

( * ) Notice: Subject to any disclaimer, the term of this patent is extended or adjusted under 35 U.S.C. 154(b) by 0 days.

(21) Appl. No.: 13/901,466

(22) Filed: May 23, 2013

(65) Prior Publication Data

US 2014/0351774 A1    Nov. 27, 2014

(51) Int. Cl.
*G06F 17/50* (2006.01)

(52) U.S. Cl.
CPC .................. *G06F 17/505* (2013.01)
USPC ......................................................... 716/102

(58) Field of Classification Search
CPC ................................ G06F 17/30; G06F 17/50
USPC ......................................................... 716/102
See application file for complete search history.

(56) References Cited

U.S. PATENT DOCUMENTS

| | | | |
|---|---|---|---|
| 6,914,551 B2 | 7/2005 | Vidal | |
| 7,991,606 B1 | 8/2011 | D'Souza et al. | |
| 8,271,773 B2 | 9/2012 | Grittke et al. | |
| 8,326,962 B2 | 12/2012 | Lo | |
| 8,555,032 B2 * | 10/2013 | Snyder | 712/32 |
| 2001/0039190 A1 * | 11/2001 | Bhatnagar | 455/450 |
| 2002/0108006 A1 * | 8/2002 | Snyder | 710/100 |
| 2009/0113037 A1 * | 4/2009 | Pouchak | 709/224 |
| 2010/0217967 A1 | 8/2010 | Viswanathan et al. | |
| 2011/0145777 A1 | 6/2011 | Iyer et al. | |
| 2011/0260752 A1 * | 10/2011 | Jouin et al. | 326/41 |
| 2012/0019371 A1 | 1/2012 | Vidal | |
| 2012/0317574 A1 | 12/2012 | Eckardt | |

\* cited by examiner

*Primary Examiner* — Vuthe Siek
*Assistant Examiner* — Mohammed Alam
(74) *Attorney, Agent, or Firm* — Rutan & Tucker LLP; John K. Fitzgerald

(57) ABSTRACT

A system and method for providing an integrated circuit that integrates with and controls a device wherein the integrated circuit design is developed based on a selection of characteristics of the device. The system and method also provide software for establishing interoperability between the integrated circuit and a controller.

14 Claims, 5 Drawing Sheets

INTERNATIONAL STANDARD INDUSTRIAL CLASSIFICATION

A. Transportation
   1.0 Aerospace
   2.0 Automotive
   3.0 Maritime
   4.0 Rail
      4.1 Amusement
      4.2 Industrial
      4.3 Light Rail
         4.3.1 Engine Type
            4.3.1.1 Diesel
            4.3.1.2 Electric
                4.3.1.2.1 Specification
                4.3.1.2.2 Functions
                     4.3.1.2.2.1 Control Types
                     4.3.1.2.2.2 Display Types
                     4.3.1.2.2.3 Input Types
                     4.3.1.2.2.4 Output Types

SYSTEM AND METHOD FOR UNIVERSAL CONTROL OF ELECTRONIC DEVICES

BACKGROUND

For some time now, technology has advanced to the point where developers and manufacturers have had the ability to provide remote control over their products. A very simple example is a television and its remote controller. A remote controller uses a wireless signal, usually infrared, to send user provided control instructions to a television set. The television set then executes those instructions, such as turning off the television or changing the channel. In the case of the TV and the remote controller, manufacturers had to design, develop and program the remote controller such that it could interact with the proprietary specifications of their television system. A remote controller setup for one television system would not work for another television system or a different system all together, such as a DVD player.

With the wide proliferation of the devices connected to the internet, developers have had the ability to develop software and controllers to control devices connected to the internet. One example is a personal computer with remote desktop software. This software enables a personal computer (with the correct software) to control another personal computer which is connected to the internet and running the remote desktop software. Another example is a mechanical device which is fitted with integrated circuits (ICs) that can be controlled by smartphones such as AR.Drone, Sphero and iHelicopter. For situations like these, developers currently have to create or develop proprietary software to provide control functionality of proprietary hardware.

Control has also gone beyond the personal computer. Developers have designed and built micro control units (MCUs) integrated with remote communication devices and programmed them to receive instructions both locally and remotely.

In the past, the controlling device that sent the instructions to host devices may have been specifically manufactured and designed by the host device manufacturers. However, new devices, such as smart phones, remove the necessity of manufacturing the controlling device because these devices are very flexible and common place. These handheld devices are smaller than the traditional television remote controllers and can be configured with software to provide instructions to any object with a receiver. The only limitations are that an object has proper hardware and that the controlling device has the proper software.

A developer who wishes to provide remote controllability to an object or product they may also create, must spend time and expenses in developing the software and hardware for this remote controllability functionality. For example, a developer might have to fit their product with an application specific integrated circuit (ASIC) specifically designed to receive remote communications. The ASIC may have a proprietary set of commands and instructions that need to be programmed into a controller to remotely control and communicate with the ASIC and control the product. Additionally, for every different type of computer or operating system, a different program or application has to be created to ensure compatibility. Furthermore, the developer has to fabricate and test the ASIC to ensure that it is working properly. All of this deters manpower from the development of the host product itself. Furthermore, the developer has to develop software specific to the ASIC and any remote controlling device. Many times, devices that could be fitted with an ASIC to allow remote control are not because of the time and costs for implementation.

All currently available automation, integration and control products and technologies are nothing more than hardware and software acting as figurative ropes and pulleys designed to manipulate devices and constructs with abstraction for the actual state of the device itself. Consequently, these existing solutions require considerable customization and development on a case by case basis for the establishment of individual/closed automation and control ecosystems. These solutions are neither universal nor capable of ad-hoc deployment scenarios. From complex proprietary based control and automation systems to low cost, Do-It-Yourself (DIY) approaches, all currently available solutions require varying degrees of hardware and software abstraction to accomplish their respective deployment goals.

In general, all competing solutions fail to offer universal control as they all are predicated upon deployment through an abstraction layer and are geared towards specific markets of which there is no cross-communication or service. For the most part, competing solutions to the above described problems introduce automation of devices as "after thoughts" and attempt to enable integration through a "bolt on" metaphor. No competing technology has yet produced a universal "plug and play" model for any third party device manufacture to employ.

Current automation and control management systems and components are mired with complex controls, proprietary commands and non-intuitive interfaces. Entry level systems which attempt to empower the end user with some degree of management of the automation device are limited to very simplistic binary states such as a "preference list." This limitation exists because there is no established mechanism for broadcasting the capabilities of the component or device.

True, universal automation and control is predicated upon the development of the integrated technology piece which will deliver plug and play for all devices and constructs that can be envisioned within an automated ecosystem. Historically, we have accepted that information and its movement through the internet have been viewed as unrestricted through the establishment of communication, messaging and interaction standards such as TCP, SMTP, and HTTP and we have viewed access to the same as commonplace due to the ubiquity of the web browser. These standards and related technologies not only assure access to information but are largely taken for granted as being available anywhere and through anything at any time.

Access to control however presents considerably greater challenges and to this day no single solution allows for the complete ad-hoc establishment and expansion of an automation plant without imposing the requirement of complex iterative development of said environment. Simply put, the seemingly contradictory expectation exists that while a printer added to a network should automatically be accessible to computers within the same network, it is also expected and accepted that a device added to an automation plant requires the reconfiguration of the totality of the automation systems for the specific recognition and operation of that singular new device.

The ideal connected world allows for equal access to information and control. The technology architects of the information age have achieved universal access to information set within this ideal yet they have only created successive obstacles to equal access to control. Each development within the automation and control space has been predicated upon the use of complex and proprietary interconnects creating virtual ropes and pulleys to the devices they intend to operate and manipulate. At no point in time have the endpoints been given the fundamental abilities to maintain their unique presence and identity in a networked infrastructure and present their modes of being for open access and manipulation. The existence of abstraction layers within the modes of address between end users and automation systems from automation systems and their endpoints assures that at no point may an end user alter, add or remove an endpoint without modifying the system that is to manage it. In effect, while access to information is always direct, the middleman in access to control becomes its liability and greatest detraction.

Additionally it is important to note that most automation invention in the "post PC revolution" has been product-centric, not technology centric. Constructs come into being through the amalgamation of a host of existing technologies and introduce very little that is "new." In doing so, these developments effectively add complexity to the landscape they ostensibly intended to simplify.

Thus, a need has been developed for a system and method that simplifies and vertically integrates the development of the hardware and software for a universal control system. Such a system and method provides solutions to the above described problems by delivering integration from within a construct to be controlled rather than via an external abstraction layer. Moreover, such a system and method should imbue the integrated construct or device with an ability to broadcast its existence, its identity, its functionality as well as its current state and reciprocally receive instruction in parallel with its traditional I/O mechanisms. The present invention satisfies these and other needs.

SUMMARY OF THE INVENTION

In its most general aspect, the invention includes a system and method for providing universal and integrated control to constructs and devices which may be controlled by micro control units (MCU) or other controlling hardware.

In another general aspect, the invention provides a mechanism and methodology for delivering true universal automation and control of any device or construct that can be imagined within an automation and control ecosystem. Any device that can be envisioned within an automation and control ecosystem, once imbued with the various aspects of the invention on a pre-fabrication/manufacturing basis, can be easily integrated into an automation and control ecosystem in a "plug and play" manner requiring no modification or alteration to the ecosystem.

In still another general aspect, the invention also provides for integration and control by providing, native connectivity from within the construct rather than through an abstraction layer apart and exterior to the construct. These capabilities are entirely new and offer a complete departure from pre-existing automation, integration and control products and technologies.

In another aspect, the system and method of the present invention provide for the development of a super horizontal imbedded solution which offers network identity, location resolution, mode and state awareness and access to the range of parameters for device use or configuration irrespective of the nature of the device which would allow consumer and industrial electronics manufacturers, appliance and machine designers and device and apparatus creators to easily and effectively bring universal access and control to their unique products.

In yet another aspect, the system and method of the present invention provide for the development of an exceptionally low cost, low power and extremely low profile component such as an ASIC which is to be made available for inclusion in a parent device. This ASIC includes both core services for inclusion of the parent device within the automation ecosystem along with extensible services made available to the parent device designer and/or manufacturer for integration to the range of functionality and configurations associated with the parent device.

In yet another aspect, the system and method of the present invention provide for the development of a hierarchal class system for establishing definitions of behavior, operation and modification for any parent device.

In still another aspect, the system and method of the present invention provide for the development of a User Interface (UI) model for dynamic awareness of end point existence and operation.

In another aspect, the system and method of the present invention provide for the development of a management layer, not to obfuscate and insulate the end user from the end point but rather to maintain concurrency of environment awareness and simplify processes for variable device access.

In still another aspect, the system and method of the present invention provide a Fabless Development Kit (FDK) that enables device manufacturers to embed unique ASIC functionality within their micro-controller (MCU) design process and integration.

In yet another aspect, the present invention includes a system providing a common interface for devices to be controlled. Analogous to the simple act of "getting in a car and driving," such an interface and control system allows a user to simply get the job done without having to relearn how to drive for every different car that the user drives; thus providing a user with a standardized interface with which to control the various devices that are a part of the user's daily life.

In one aspect, the invention includes a system and method for designing integrated circuits (IC) to integrate into an electronic device for control using IC components that are developed for generic characteristics of electronic devices. This way, IC devices components may be standardized and designed based on functionality thus removing the necessity of designing a proprietary device in house. A developer can select the functionality of their device and an IC can be designed off the standard components. Furthermore, because standard IC components are used, standard software can be used to control and run on the IC devices.

In another aspect of the invention, a user interface (UI) standard is developed and through the deployment of this UI standard, a UI control interface may be coupled with each IC component. This allows for an intuitive user experience because the controls function similarly across multiple devices.

In yet another aspect of the invention, the designed IC is provided in a software representation. The software representation may be in layout and/or schematic format. This would allow for developers to make simple tweaks, simulate, and/or test the IC design. Furthermore, the layout and/or schematic can be sent to a manufacturer for manufacturing the IC. Having a fabless IC reduces IC development costs.

Furthermore, in another aspect of the invention, the ICs may be designed with fail safes for handling loss of connection or manual control overrides.

In another aspect, the present invention includes a computer implemented method for designing an IC which controls a device when integrated into the device comprising: receiving a selection of categorized input and output characteristics of the electronic device; providing an IC design based on the selection of input and output characteristics of the device; and providing software for controlling the device through an IC based on the IC design.

In still another aspect, the invention includes providing software for controlling the device includes providing a user interface and virtual controls for a controller which allows for controlling the device through the IC. In an alternative aspect, the user interface is based on the selection of input and output characteristics. In yet another alternative aspect, IC allows for status input from the device and is capable of reporting the status to a controller.

In yet another aspect, the IC design is based on at least one predetermined IC component which is able to control one of the input or output characteristics. In still another aspect, the IC design is provided as a software schematic, layout, or both.

In another aspect, the IC may be configured to communicate an identity and an operating state of the device to a controller and wherein the controller is configured to register the identity of the device, and based on the identity of the device, communicate control commands to the device to alter the operating state of the device.

In yet another aspect, the invention includes a system comprising: one or more processors; logic encoded in one or more non-transitory computer-readable media that, when executed by the one or more processors, is operable to: receive a selection of categorized input and output characteristics of a device; provide an IC design based on the selection of input and output characteristics of the device; and provide software for controlling the device through the IC. In one alternative aspect, the provided IC design includes: a user interface for communicating with a controller which provides a virtual control for the device through the IC. In another alternative aspect, the user interface is based on the selection of input and output characteristics.

In a further aspect, the IC includes an input for receiving status information representing an operating state of the device and is configured to communicate the status information to the controller.

In yet a further aspect, the IC design is based on at least one predetermined IC component which is able to control one of the input or output characteristics. In another aspect, the IC design is provided as a software schematic, layout, or both.

In still another aspect the one or more non-transitory computer-readable media further comprises logic that, when executed by the one or more processors, is further operable to: simulate the IC's functionality based on the IC design.

In yet another aspect, the invention includes a non-transitory computer-readable medium storing instructions that, when executed by a processor, perform a method comprising: receiving a selection of categorized input and output characteristics of the device; providing an IC design based on the selection of input and output characteristics of the device; and providing software for controlling the device through the IC.

In a further aspect, the invention includes communicating a user interface to a remote controller which provides a virtual control for the device through the IC. In one alternative, the user interface is based on the selection of input and output characteristics. In still a further aspect, the IC allows for status input from the device and is capable of reporting the status to the controller. In another aspect, the IC design is based on at least one predetermined IC component which is able to control one of the input or output characteristics. In still another aspect, the IC design is provided as a software schematic, layout, or both.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figures 1, 2:
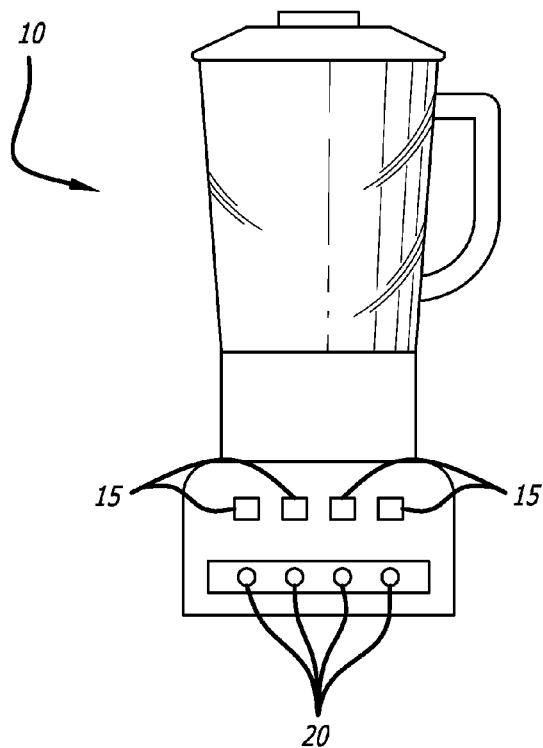
FIG. 1 is a frontal view of a device that may be controlled using various embodiments of the present invention.
FIG. 2 is an exemplary depiction of a top-level hierarchal classification scheme in accordance with one embodiment of the invention.

As will be described hereinafter in greater detail, the various embodiments of the present invention relates to a device control system and method with uniform IC and UI development. For purposes of explanation, specific nomenclature is set forth to provide a thorough understanding of the present invention. Description of specific applications and methods are provided only as examples. Various modifications to the embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

The various embodiments of the invention provide a mechanism for delivering true universal automation and control of any device or construct that can be imagined within an automation and control ecosystem. Any device that can be envisioned within an automation and control ecosystem, once imbued with the invention on a pre-fabrication/manufacturing basis, can be easily integrated into an automation and control ecosystem in a "plug and play" manner requiring no modification or alteration to the ecosystem. The embodiments of the invention provide for integration and control by providing native connectivity from within the construct rather than through an abstraction layer apart and exterior to the construct.

All currently available automation, integration and control products and technologies are nothing more than hardware and software acting as figurative ropes and pulleys designed to manipulate devices and constructs with abstraction from the actual state of the device itself. Consequently, these existing solutions require considerable customization and development on a case by case basis for the establishment of individual/closed automation and control ecosystems. These solutions are neither universal nor capable of ad-hoc deployment scenarios. From complex proprietary based control and automation systems to low cost, DIY approaches, all currently available solutions require varying degrees of hardware and software abstraction to accomplish their respective deployment goals. The embodiments of the invention provide a direct, non-abstracted interface for the inclusion of any construct or device within an automation ecosystem.

Currently realized and envisioned integration, control and automation technologies fail to offer seamless deployment and management of their endpoints due to the many abstractions that exist between the automation management system and the endpoint. The various embodiments of present invention overcomes this failure by providing the mechanism by which any device and/or construct may be imbued with the capability of being seamlessly added to a network of like-kind devices and/or constructs and managed within an integration, control and automation system that has real time awareness of the device and/or construct. The net result of the implementation of these various embodiments of the invention is the realization of the standardization of universal integration, control and automation through an interface that is as ubiquitous as the standardization of the web server and web browser are for information distribution.

In general, the invention is embodied in four core components which work together to produce a system by which discrete devices may be seamlessly added to a network of like-kind equipped devices producing an ecosystem that may be fully controlled and automated. The four core components are: 1) An ASIC or like-kind construct which is to be made available for inclusion in a parent device. This ASIC component includes both core services for inclusion of the parent device within the automation ecosystem along with extensible services made available to the parent device designer and/or manufacturer for integration to the range of functionality and configurations associated with the parent device; 2) a hierarchal class system for establishing definitions of behavior, operation and modification for any parent device; 3) a UI model for dynamic awareness of end point existence as well as modes of operation; and 4) a management layer for maintaining concurrency of environment awareness and for simplification of control of the aforementioned device.

As will be discussed more fully below, the ASIC is typically imbedded within a device and/or construct intended for inclusion within an automation ecosystem. This imbedding, in some embodiments, takes place at time of device manufacturing and is part of the finished good design of the device. In other embodiments, the ASIC may be added to the circuitry supporting the MCU of the device, rather than being imbedded within the MCU itself.

In the various embodiments of the invention, the ASIC is created with data provided by the device manufacturer through the use of an FDK (Fabless Development Kit) which provides a database of specific information which can be used to define the operation of the device. The FDK may be a software application or program, which may take the form of an Integrated Development Environment (IDE). The FDK may be specifically designed to assist a developer in designing and manufacturing control circuitry and programming. The FDK will typically access a database of structured information derived from the hierarchal class system defining the behavior, operation and communication characteristics of the device into which the ASIC is to be imbedded.

The various embodiments of the invention permit each device in which the ASIC is imbedded to present itself autonomously to an automation ecosystem's management layer and/or controller device without any configuration or customization of the device, management layer and/or controller device and without any abstraction components or related communications technologies. Discrete device manufacturers of any type will have the ability to make their constructs "automation ready" with no limitation on device type or function. Much as the World Wide Web with the advent of the web server and web browser along with their core protocols of HTTP and HTTPS and core languages HTML and XML (via CSS) enabled ubiquity for the movement of information, the various embodiments of the invention will, for the first time, offer ubiquity for control and create a true universally accessible mechanism for integration and automation.

One of the key aspects of the various embodiments of the present invention is the observation by the inventor that the control systems applicable to the majority, if not all, of devices is that an individual device may be defined by four parameters: 1) control type; 2) display type; 3) input type; and 4) output type. FIG. 1 illustrates this using a common household appliance, namely, a blender 10.

A blender is a common kitchen appliance. It includes a motor, circuitry to operate the motor, one or more inputs 20, typically buttons of some type, and a display, which may be individual lights 15, as shown in FIG. 1, or may be a single panel display. Older blenders may use a rotatable dial with one or more positions assigned to providing one or more speeds or functions, and the use of dots, words or other graphic elements to display the state of the blender. Utilizing the principles described herein in reference to the various embodiment of the invention, it is possible to define the blender with parameters included in a hierarchal database, and thus the principles of the invention apply to any device. However, it will be understood that the various embodiments of the invention are particularly applicable to devices that include MCUs to provide for control of the device through natively interfacing with and/or addressing the MCU. It will also be understood that control functions described below may, through the use of the embodiments of the invention, be built into the MCU, or may be provided through an IC that has been added to the circuitry of the device to provide for control of the device in parallel with the MCU.

FIG. 2 illustrates one embodiment such a hierarchal database. In this illustration, the hierarchal database contains data directed to particular aspects of a device. For example, such hierarchal databases are used by the United States Patent and Trademark Office as classification aids for classifying inventions into one or more fields of technology. The exemplary database of FIG. 2 will typically have a high level list of devices, divided into such categories as aerospace, automotive, maritime, rail, and the like. As shown, the upper level rail category can be further divided into sub-categories of amusement, industrial, and light rail. A further sub-categorization provides classes for diesel and electric engines, further sub-categorized by specifications and functions. The function sub-category is finally categorized again into control types, display types, input types and output types.

Figure 3:
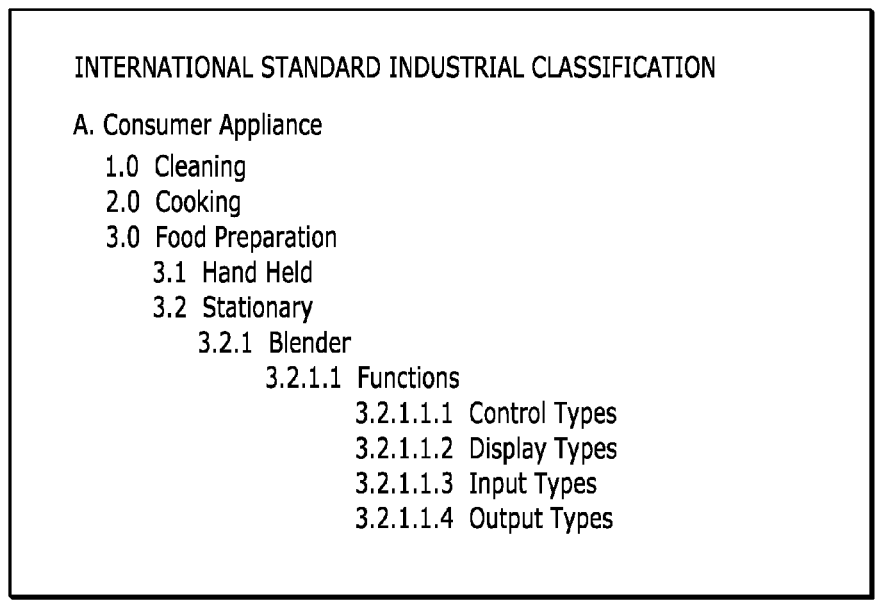
FIG. 3 is an exemplary depiction of sub-level of the hierarchal classification scheme of FIG. 2.

FIG. 3 illustrates a categorization scheme similar to that shown in FIG. 2 for consumer appliances. In this example, the top-level category of consumer appliances is divided into sub-categories such as cleaning devices, cooking devices, and food preparation devices. Food preparation devices are further categorized as either hand-held or stationary. One example of a stationary food preparation device is a blender like that described with reference to FIG. 1. Diving further into the classification library provides a category describing the functions of the blender, which functions may be further categorized by control type, display type, input type, and output type. For example, a blender may be controlled by a rotary dial, with a display that amounts to a word or graphic or symbol that displays the state of the blender when the input type is actuated. In another example, the input device may be push buttons or touch sensitive elements, and the display type may be a LCD or other type of electronic display that informs the user what state the blender is in when an input type is actuated. The output of the input may also be discerned from the display type, as well as experientially, such as by hearing the increase or decrease of sound generated by the blender as the speed of the motor is increased or decreased, pulsed, or stopped upon actuation of the input type. As one skilled in the art will immediately understand, any device, such as a blender, can be defined by defining its control type, display type, input type, and output type.

Figure 4:
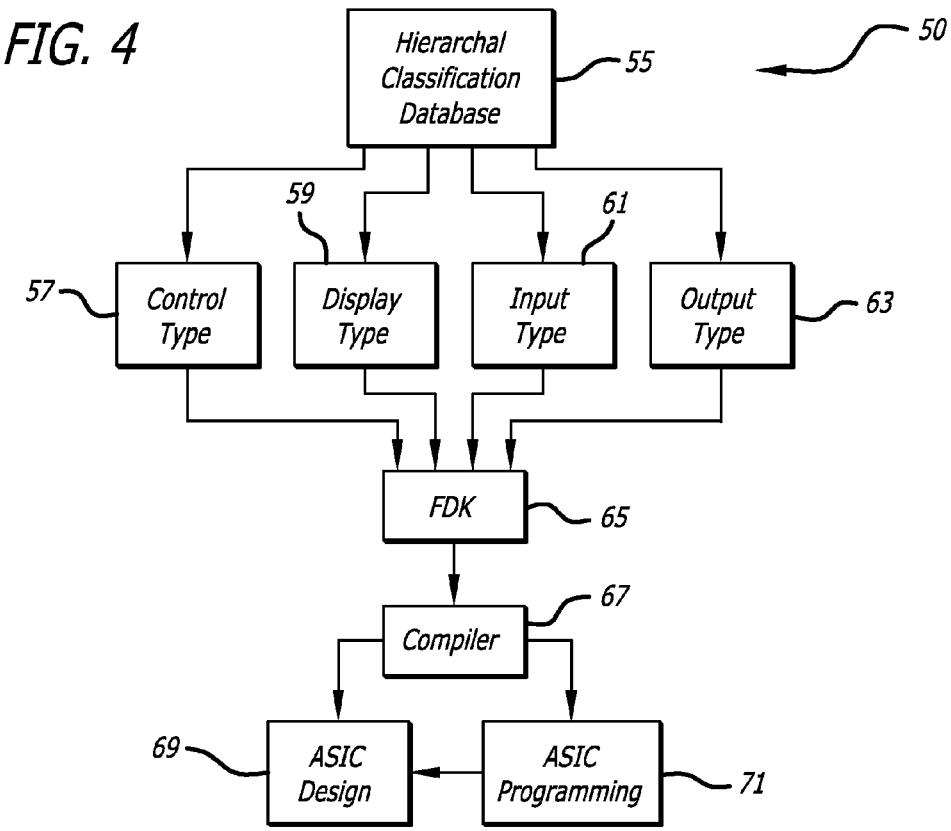
FIG. 4 is a flow chart of one embodiment of the invention depicting an exemplary method for using an FDK to design an ASIC.

FIG. 4 is a graphical representation of one embodiment 50 of a system and method for designing and programming an ASIC that may either be incorporated directly into a device's MCU design, or may be a separate integrated circuit that is in operational communication with a device's MCU. In this exemplary embodiment, the circuit designer of the ASIC uses a Fabless Development Kit (FDK) 65 to design the circuitry of an ASIC that will provide native control and communications capability to a device, such as the blender described above. In this example, the FDK is embodied in software, or a combination of software and hardware and includes a hierarchal classification database 55 and an appropriate user interface (not shown). The ASIC designer interacts with the user interface of the FDK to access the hierarchal classification database using various menus or other input schemes of the FDK user interface. For example, it is contemplated that designer will may use a series of cascading menus corresponding to the classification scheme of the hierarchal classification scheme described with reference to FIGS. 2-3. Once the designer has reached the desired classification level, such as level 3.2.1.1.1 shown in FIG. 3 for the blender, the designer chooses a particular control type to be included in the operation of the circuitry. The designer may also edit the parameters associated with that particular entry as needed for the particular device for which the ASIC is being designed.

The process is continued until the control type 57, display type 59, input type 61 and output type 63 for the blender are defined. The parameters associated with the designers choices are then input into the FDK engine 65. Once input into the FDK engine 65, compiler 67 of the FDK engine 65 may access a library of circuits and embedded programming suitable for creating ASIC design 69 and its associated ASIC Programming 71. The software of the FDK may access a library of circuits and embedded programming suitable for carrying out the functions required for creation of an ASIC that will carry out the functions desired by the designer. It is also intended that the FDK may also include specifications for circuitry allowing for the ASIC to broadcast the identity and control functions to a controller, allowing the controller to seamlessly register the device in a plug and play manner. ASIC design 69 may be a circuit design such as a layout or a schematic that can be sent out to a manufacturer for fabrication. ASIC Programming 71 may be software to be programmed and/or stored in a fabricated ASIC and/or a controller to establish interoperability between the controller, ASIC, and/or a device that the ASIC is integrated with.

Fabless design of ICs and MCUs is well known in the art. In general, the term fabless design is applied to process where the design of the IC is accomplished separately from the manufacture of the device itself, rather than past methods which relied upon vertical integration of design and manufacture. Accordingly, a fabless process within the scope of the various embodiments of the present invention are particularly advantageous, in that the FDK may be used by a device maker, such as a blender manufacturer, to design and manufacture into the control circuitry of a device all of the functions the manufacturer desires, including the addition of a standardized communication scheme that would allow a controller to sense the presence of a device incorporating an ASIC designed in accordance with the embodiments of the present invention, and to register the device and communicate with the device without requiring an extensive set up or programming of the device or the controller.

It will be apparent to those skilled in the art that in many ways, the FDK of the various embodiments described herein may function similarly to a so called software development kit or an IDE. A software development kit has similar functionality, that is, a software development kit is typically a set of software development tools that allows for the creation of applications for a certain software package, software framework, hardware platform, computer system, video game console, operating system, or similar development platform. The inventor has realized that such a framework may also be applied in the fabless design of ICs, in concert with a hierarchal classification database that allows for the classification of the control type, display type, input type and output type of any control system required to control a device. In this manner, using the FDK and hierarchal classification device of the embodiments of the invention, an ASIC designer may build in native control functionality to be incorporated into any device capable of communicating with and being controlled by a controller. In essence, the hierarchal classification database and FDK system may provide a standardized system of programming control functionality into any controllable device. Such a control scheme would eliminate the need to perform custom "set up" or installation changes into a controller or a device to enable the device and controller to communicate with each other.

Figure 5:
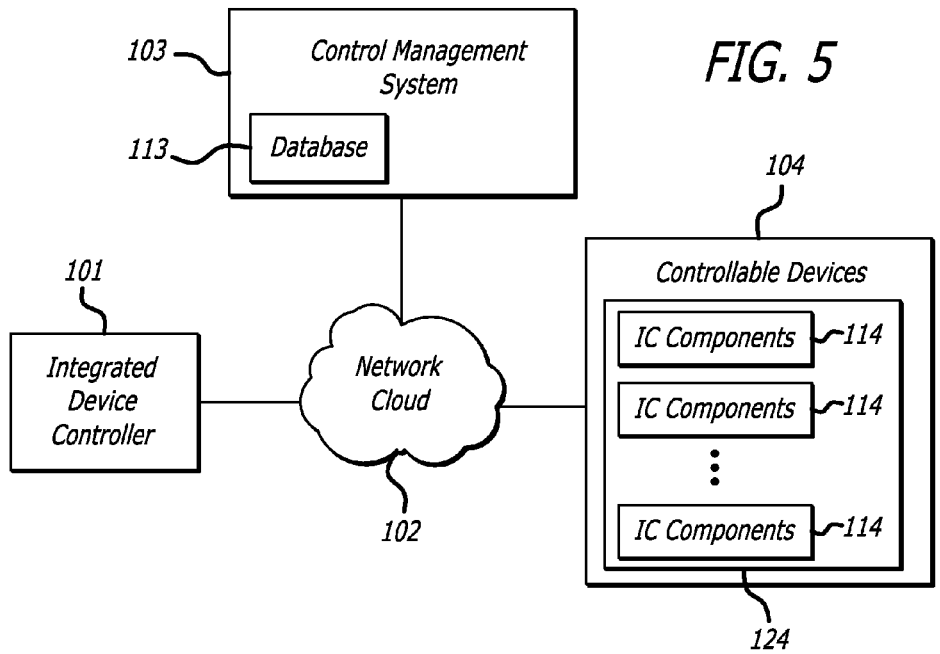
FIG. 5 is an exemplary Integrated Device Control System wherein a Device Management System is used.

FIG. 5 illustrates an exemplary Integrated Device Control System 100 according to one embodiment of the present invention. Integrated Device Control System 100 may have one or more Integrated Device Controllers 101 which may be one or more computer systems and/or may include, by way of example, wireless or wired controllers, including controllers that are remote from the one or more devices being controlled which may connect to Network Cloud 102. Network Cloud 102 generally represents a network or collection of networks (such as the Internet, private intranet, wide area networks, internal networks, personal area networks, or a combination thereof) over which one or more Integrated Device Controllers 101, Control Management System 103, and/or Controllable Devices 104 may interact with each other. In another embodiment the system may use a mesh network or any other suitable network. In still another embodiment, the system may use a pseudo-network, such as a peripheral bus, which may be considered an ad hoc network, or any other non-traditional form of a communication scheme that provides for communication between devices or components. In yet another embodiment, Control Management Systems 103 may be imbedded within Integrated Device Controllers 101 and/or Controllable Devices 104.

Control Management System 103 may contain one or more databases 113 which stores data and/or computer instructions for controlling one or more IC Components 114 within IC 124. Databases 113 may also include data and/or UI configurations for Integrated Device Controllers 101, instructions for Integrated Device Controllers 101 to interact with Control Management System 103 and/or Controllable Devices 104 and/or user access settings/security. For example, in one embodiment, the IC may include all autonomous logic and data necessary to carry out the control functions of present invention; or the IC may only include a portion of the autonomous logic and data necessary, and be configured to access a separate data source or processor to obtain any other logic or data necessary to carry out the control functions of the invention.

Control Management System 103 may also be a Web Server which may be used to provide one or more Integrated Device Controllers 101 the ability to interact with Control Management System 103 and/or Controllable Devices 104 through a webpage or other interfaces.

According to one embodiment, Control Management System 103 may be a unitary server or may be a distributed server spanning multiple computers or multiple data centers. The term server may refer to various types of servers, such as, for example and without limitation, a web server, news server, mail server, message server, advertising server, file server, application server, exchange server, database server, proxy server, and the like.

Integrated Device Controllers 101 may be device incorporating a computer or processor system which runs one or more operating systems, such as, for example, OS X, iOS, Windows, Android, Unix, Linux, and the like, and executes one or more applications, such as a web browser, for example, Safari, Internet Explorer, Firefox, Chrome, Opera, and the like. Integrated Device Controllers 101 may have users using the Integrated Device Controllers 101. A user may enter a Uniform Resource Locator (URL) or other address directing a web browser to a server, and the web browser may generate a Hyper Text Transfer Protocol (HTTP) request and communicate the HTTP request to a server. A server may accept the HTTP request. Integrated Device Controllers 101 may render a web page based on the HTML files from a server, a thick client, or the like. As an example and not by way of limitation, web pages may render from one or more combinations of HTML, XHTML, XML, Java Script, Java, Microsoft Silverlight, AJAX, and the like. In another embodiment, Integrated Device Controllers 101 may run computer instructions which provides a UI for the client to interact with. The user's interaction with Integrated Device Controllers 101 may instigate communications between Integrated Device Controllers 101, Control Management System 103 and Controllable Devices 104. In one embodiment, a user's interaction with a UI may provide real time control over Controllable Devices 104. Control Management System 103, and/or Controllable devices 104 may also be made of one or more computer or processor systems.

Controllable Devices 104 may be any electronic device including but not limited to a light switch, a lamp, automobile, kitchen appliance, home theatre appliance, computer system, phone, or the like.

Figure 6:
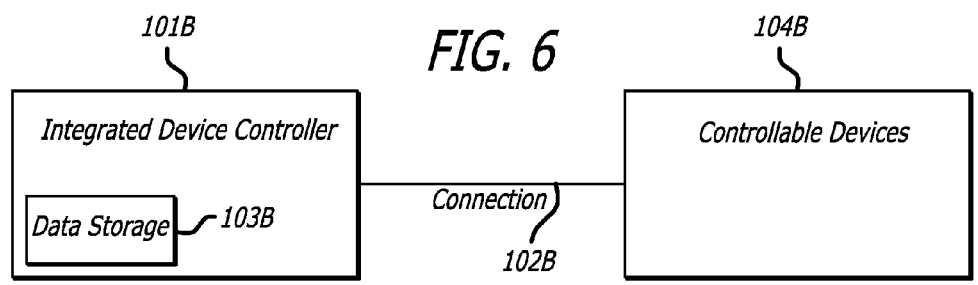
FIG. 6 is an exemplary Integrated Device Control System wherein device management software is held on the controlling device.

FIG. 6 illustrates an exemplary Integrated Device Control System 100B according to another embodiment of the invention. Integrated Device Control System 100B may have one or more Integrated Device Controllers 101B which may be one or more computer systems and may connect to one or more Controllable Devices 104. Integrated Device Controllers 101B may be connected to Controllable Devices 104B through Connection 102B which may be connected through the Internet, wired connection, private intranet, wide area networks, internal networks, personal area networks, or a combination thereof. Alternatively, the connection between Integrated Device Controllers 101B and Controllable Devices 104B may be a direct wired or wireless connection. Wireless connectivity may be obtained using RF, Infrared, Wi-Fi, Bluetooth or other suitable technologies.

Integrated Device Controllers 101B may have a memory or data storage 103B which contains Control Management Software. The Control Management Software may allow the Integrated Device Controllers 101B to interact with Controllable Devices 104B through a webpage, software application, or other interfaces as described above.

An Integrated Device Controller (IDC) running appropriate Control Management Software in accordance with the principles of the present invention may be configured to either actively query the ecosystem in which the IDC is used to find and register Controllable Devices residing within a predefined area (which may be limited by the range of a transmitter incorporated within the IDC) or addressable network range, or the Control Management Software may control the IDC to passively listen for signals emitted by Controllable Devices within the range of the IDC. In this manner, the Control Management Software enables the IDC to cooperate with a Controllable Device that includes an IC (which may be an ASIC) in accordance with the various embodiments of the present invention to automatically register the Controllable Device with the IDC in a plug and play manner. As has been discussed above, the IC of the various embodiments of the invention, incorporated into the Controllable device, is configured to natively provide the identity, operational state and communication mode of the Controllable Device to the IDC during the registration process.

Integrated Device Control System 100B may have one or more Integrated Device Controllers 101B which may be one or more computer systems and may connect to Connection 102B. Integrated Device Control System 100B may also Integrated Device Controllers 101B may have a memory or data storage 103B which contains Control Management Software. The Control Management Software may allow for the Integrated Device Controllers 101B to provide one more Integrated Device Controllers 101B the ability to interact with Controllable Devices 104B either directly, or where appropriate connection to a network is available, through a webpage, software application, or other interfaces.

Figure 7:
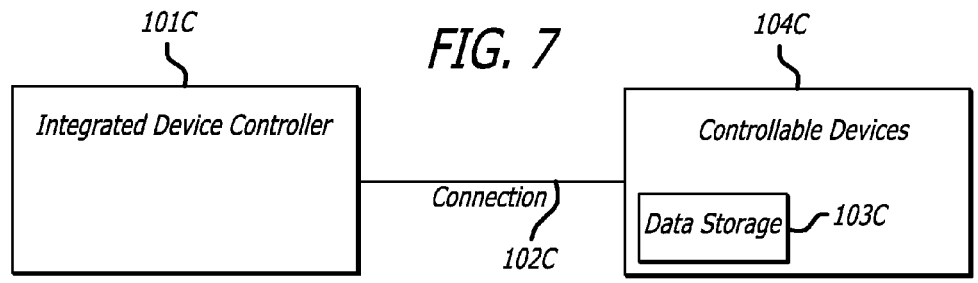
FIG. 7 is an another exemplary Integrated Device Control System wherein device management software is held on the IC.

FIG. 7 illustrates yet another exemplary Integrated Device Control System 100C according to another embodiment. Integrated Device Control System 100C may have one or more Integrated Device Controllers 101C which may be one or more computer systems and may connect to one or more Controllable Devices 104C. Integrated Device Controllers 101C may be connected to Controllable Devices 104C through connection 102C which may be the Internet, private intranet, wide area networks, physical connection, wired connection, wireless connection, wired network, internal networks, personal area networks, or a combination thereof.

Controllable Devices 104C may have a memory or data storage 103C which contains Control Management Software. The Control Management Software may allow for the Controllable Devices 104C to provide one more Controlling Devices 101C the ability to interact with Controllable Devices 104C through a webpage, software application, or other interfaces. In another embodiment, Controllable Devices 104C may send the Control Management Software for installation and/or execution by Controlling Devices 101C which enables interactions between the two through a webpage, software application, or other interfaces.

Figure 8:
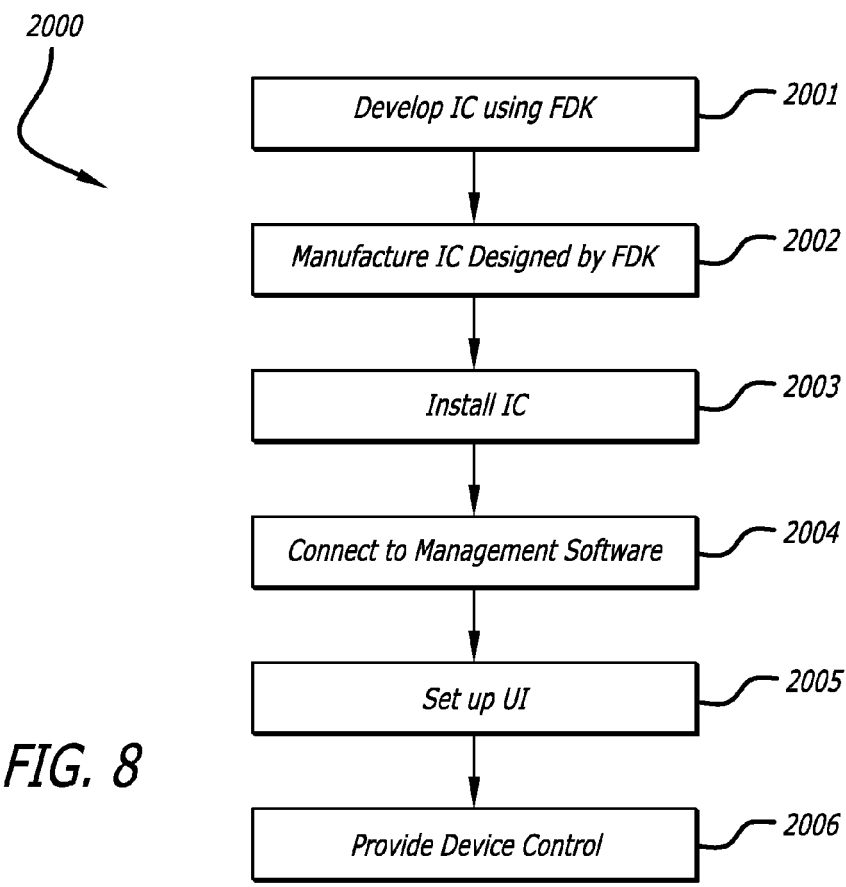
FIG. 8 is a flow chart of an exemplary implementation of a system which allows for developers to implement remote controllability to a device without developing integrated circuits and controlling software in-house.

FIG. 8 is a flow chart of an exemplary implementation of a system 2000 which allows for developers to implement remote controllability to a device without developing integrated circuits and controlling software in-house.

At step 2001, system 2000 may provide a developer a fabless integrated circuit (IC) development kit. The FDK may be software which, when executed on a computer system, allows for a developers to input interface attributes of a device which a developer intends to enable a user to remotely control the device. The FDK may provide a software representations of a complete IC design. In one embodiment, the software representation may be a schematic and/or layout. The user may have the ability to edit the software representation of the IC or the software representation may be locked and only allow for testing. The software representation may also provide simulation and debugging capabilities through proprietary software and/or design automation software. Design automation software may include but, is not limited to, computer aided design software developed by Synopsis, Inc.; Cadence Design Systems, Inc.; Magma Design Automation, Inc.; and the like.

The IC, when manufactured, may be integrated with the developer's device and provide capabilities to remotely control the product with a computer. In one embodiment, the FDK may also provide accompanying software to run with the IC (assuming it is a programmable IC) and/or on a computer to enable remote control.

At step 2002 a developer may send the fabless IC design provided by the FDK to a manufacturer for manufacturing. A developer may implement the manufactured IC into the developer's product. In this way, much of the costs for designing, testing, and developing is reduced. System 2000 also provides at step 2002, access to management application software that manages the interoperability between an integrated device controller and the IC. This may include, identity, user interface cues, feedback from the IC, instructions, communications, security, and the like.

A developer may send the IC design created using the FDK to a IC manufacturer to manufacture the integrated circuit for integration with a product. In one embodiment, a program provided by the FDK is programmed into the IC for pairing with one or more computers to be used as a controller.

At step 2003 The developer may install the IC into their device and integrate it with the control aspects of the device. For example, if the device were a microwave, the IC may integrate with the microwave controls such that the IC could completely or partially manipulate the microwave. The IC may be directly connected to the device's internal bus such that it directly manipulates the device, and/or provides instruction to a native controller.

At step 2004 the device may connect to management software which syncs with the device. The management software may provide interoperability between the IC and an integrated device controller. The management software may control access, provide control instructions, identify the device and/or controller. The management software may provide software to allow the IC and an integrated device controller to be plug and play. An integrated device controller may also sync with the management software and may indicate a request to control the device. The management software may have a security protocol that prevents unauthorized connections to the device. Connection to the device may be password protected.

At step 2005 a UI is provided to the integrated device controller which matches the controlled device and provides virtual controls which may manipulate the device. The management software may also provide status information of the device, such as whether the device is on or off.

At step 2006 the integrated device controller is given control. Any user manipulations of the UI controls are relayed to the IC to control the device. The management software may also update the integrated device controller with any data provided in response to the control of the device. Furthermore the IC may provide redundancy and responses that informs the management software and integrated device whether commands have been accepted, whether the connection is still intact, quality of the connection, and the like.

The IC may also provide fail safes for when a connection is lost or when manual control is being conducted. In one embodiment, the IC may shut off or enter a safety mode when a connection to an integrated device controller is lost. The IC may also provide priority to manual control commands which may automatically override and/or disconnect an integrated device controller. In the various embodiments of the present invention, the IC also provides data representative of the state of the IC and/or device to a controlling device, and thus may have an inherent awareness of such state, which is useful in determining the control command necessary to alter the state of the IC or device.

Referring again to FIGS. 2-4, additional details of an embodiment of a method using the FDK to design an ASIC in accordance with the principles of the invention when executed by a computer is described. As described previously, the FDK may provide a menu of categorized devices for a user to select from. In one embodiment, the menu may start with a limited number of broad categories of devices which drills down into a more specified category of a device with each selection until a final device is selected. By way of example and not limitation, a menu may have, for example, the classes: appliance, automotive, environment. Selecting the class appliance, may provide the additional categories: kitchen appliance, office appliance, entertainment appliance. Once selecting kitchen appliance, a menu of kitchen appliances may be provided such as blender, coffee machine, stove, etc. Once the user selects a device, the user may be provided with a selectable set of characteristics of the user's device. By way of example, the type of characteristics may include control, display, input and output, communications.

Characteristics may include multiple types within each characteristic. For example, types of control may include wheel, joystick, button, knob, switch, etc. Display type references the form of visual communication, such as for example, alpha numeric, base ASCII, extended ASCII, bitmap, or even more complex displays such as HTML decoding engines. These display types may be communicated to a user of the device by LCD, LED, OLED, and the like. In other embodiments input and output of the device may be audio, video, etc. For example, the blender's display references an "output" of the vendor (what it is doing) and the blender's buttons references an "input," a command or instruction to modify or initiate a new action on the blender.

Communications may include Wi-Fi, Bluetooth, serial, public switch telephone network, WiMax, LTE, etc. In other embodiments the FDK may include more or less characteristics and/or use different categorizations.

A user may choose multiples of each characteristics and/or types within each characteristic. In some cases, a user may be able to add additional specifications related to the environment which the IC would be connected into. These specifications may include, for example, real estate (chip size and dimensions), clock speed; interrupts; operating voltages, current, power; communication types such as HDL; and the like. In some embodiments, the FDK may dictate the minimum necessary elements for the designed IC to run properly.

Each characteristic and/or type may be linked with a predetermined standardized IC for performing and controlling those characteristics and types on a device. The FDK may design and develop a complete IC design layout and/or schematic that could be sent to a IC manufacturer for manufacturing. The FDK may have a library of standard IC parts which each selection is linked to. Once all selections are made the FDK may combine the standardized IC parts and provide a CAD design of a resulting IC. Similar to how CAD software may provide a library of standard cells or blocks when designing an IC, the FDK may provide standardized IC components that fully function and can control a device based on the user's chosen characteristics.

In one embodiment, the FDK may combine combinations of unmodified standard IC components based on the user's choices. In another embodiment, the FDK may alter one or more standard IC components chosen by a user to increase efficiency, reduce redundant parts, fit a certain size, and/or compensate for certain specifications chosen by a user. The FDK may be expandable with additional IC components as they are developed and each iteration may be backwards compatible.

Figure 9:
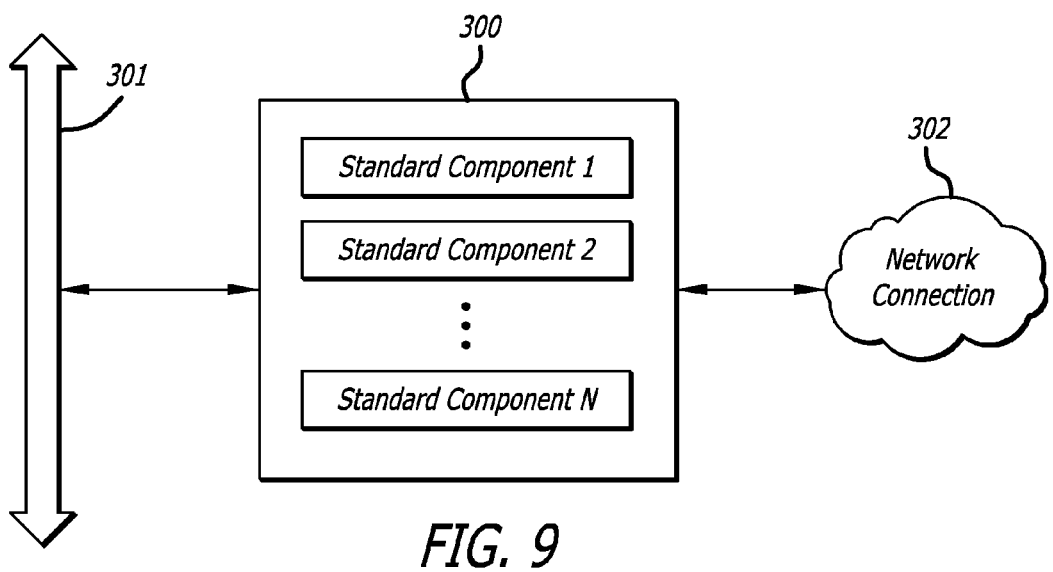
FIG. 9 is an exemplary block diagram of an IC designed using a fabless design kit.

FIG. 9 is an exemplary block diagram of an IC 300 designed using an FDK. IC 300 may have one or more standard IC components 1 through N. IC 300 may receive input from either the device it is integrated with through internal bus 301 or from an integrated device controller through a network connection 302. In one embodiment, one or more of the IC components may be configured to receive information from a network interface controller. In another embodiment, a Network Interface Controller (NIC) may be integrated with IC 300 through one or more standard IC components. IC 300 may also be configured for providing output to control the device or provide feedback to a controller.

According to an embodiment, an application management software may manage the interoperability between an integrated device controller and a controlled device containing an IC designed through an FDK. This management software may be installed on a computer which is being used as an integrated device controller, held on a server, held on the device's IC or a combination of thereof. The management software may determine the identity of the object, the input output capabilities, UI settings, security, drivers, firmware and communications.

Figure 10:
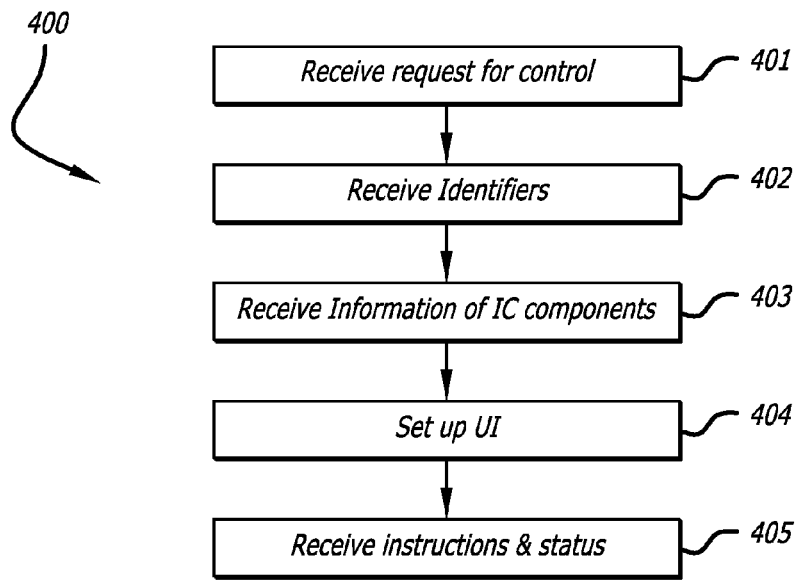
FIG. 10 is a flowchart of exemplary management software for managing interoperability between a computer system and an IC in an electronic device.

FIG. 10 is a flowchart of Management software 400 according to an embodiment. At step 401 management software 400 may receive a request from a computer requesting control of a particular object that is integrated with an IC designed through the FDK. In one embodiment, a request may be made using a unique identifier of the object. In another embodiment, the object my broadcast its existence over a network, such that any potential computer on the same network may request access or control.

At 402, Management software 400 may receive an identifier associated with the IC and object. The identifier may provide the Management software with control parameters for the IC. It may also provide drivers or firmware necessary to operate the IC. In one embodiment, drivers and firmware would be part integrated with the management software. The IC may also provide user interface cues, which would provide the management software indications on which user interface controls would be used on an integrated device controller.

At 403, Management software 400 receives information regarding which IC components were chosen through the FDK, and determine what inputs, outputs, status updates and UI controls are enabled for the IC/device.

At 404, Management software 400 may set up a user interface on an integrated device controller based on the IC components. In one embodiment the user interface may be displayed in a web browser or other like-kind client interface. In another embodiment, the management software may instruct which UI controls are to be displayed on the integrated device controller, through a native program installed on the integrated device controller. In yet another embodiment, the management software may provide an executable file which installs software specific to the IC/device controls for installation and use on the controller.

At 405, Management software may receive instructions or status updates from either a user manipulating the integrated device controller or the IC. For example, a user may manipulate controls in the UI that requests a device to be turned off. The user's action may be sent to Management software 400. In response, Management software 400 may relay a corresponding instruction to the IC to turn off the device. Similarly, the IC may send a status information such as whether the devices is on or off to Management software 400. The management software may relay periodic updates regarding the status and/or whenever a status has changed. The UI may reflect the current status and/or any status changes from the device.

According to an embodiment, the UI controls and status updates may be predetermined and standardized based on the IC components used. The UI controls may be consistent over all devices which use the same IC component in its IC. For example, an IC implemented in a car used an IC component for turning a steering wheel, the integrated device controller may display a virtual steering wheel to allow a user to steer. If the same IC component was used in an IC for steering a motor boat steering wheel, the virtual display may be identical on the integrated device controller display. In one embodiment, a developer or integrated device control user may choose among several standardized UI controls for each IC component.

In yet another embodiment, a developer or user may be able to customize the UI controls. Some UI controls may be unique specific to certain IC components, category group, and/or device defined in an FDK. In one embodiment, the UI may be a replica of the device's native display. For example, a device may have a small LCD display and/or LED display. The IC may output the display data to the integrated device controller, and the integrated device controller may display an identical replica. In some cases, the device may have a touch screen and the integrated device controller may replicate the touch screen controls on its own display and allows for remote interaction through the replicated touch screen controls.

Figure 11:
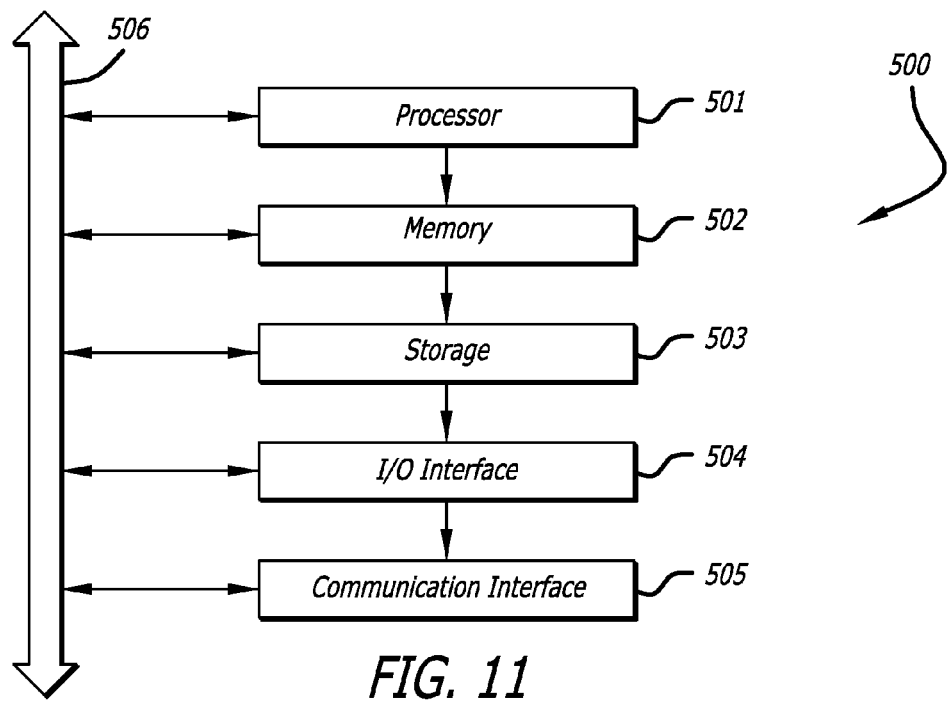
FIG. 11 illustrates an exemplary computer system architecture.

FIG. 11 illustrates an exemplary computer system 500 which may be used with some embodiments of the present invention. Computer system 500 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 500 may be a combination of multiple forms. Computer system 500 may include one or more computer systems 500, be unitary or distributed, span multiple locations, span multiple systems, or reside in a cloud (which may include one or more cloud components in one or more networks).

In one embodiment, computer system 500 may include one or more processors 501, memory 502, storage 503, an input/output (I/O) interface 504, a communication interface 505, and a bus 506. Although this disclosure describes and illustrates a particular computer system having a particular number of particular components in a particular arrangements, this disclosure contemplates other forms of computer systems having any suitable number of components in any suitable arrangement.

In one embodiment, processor 501 includes hardware for executing instructions, such as those making up software. Herein, reference to software may encompass one or more applications, byte code, one or more computer programs, one or more executable, one or more instructions, logic, machine code, one or more scripts, or source code, and vice versa, where appropriate. As an example and not by way of limitation, to execute instructions, processor 501 may retrieve the instructions from an internal register, an internal cache, memory 502 or storage 503; decode an execute them; and then write one or more results to an internal register, an internal cache, memory 502, or storage 503. In one embodiment, processor 501 may include one or more internal caches for data, instructions, or addresses. Memory 503 may be random access memory (RAM), static RAM, dynamic RAM or any other suitable memory. Storage 505 maybe a hard drive, a floppy disk drive, flash memory, an optical disk, magnetic tape, or any other form of storage device that can store data (including instructions for execution by a processor).

In one embodiment, storage 503 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores may store computer readable media, data and/or combinations thereof. Storage 503 maybe be internal or external to computer system 500.

In one embodiment, input/output (I/O) interface 504, includes hardware, software, or both for providing one or more interfaces for communication between computer system 500 and one or more I/O devices. Computer system 500 may have one or more of these I/O devices, where appropriate. As an example but not by way of limitation, an I/O device may include one or more mouses, keyboards, keypads, cameras, microphones, monitors, display, printers, scanners, speakers, cameras, touch screens, trackball, trackpad, biometric input device or sensor, or the like.

In still another embodiment, a communication interface 505 includes hardware, software, or both providing one or more interfaces for communication between one or more computer systems or one or more networks. Communication interface 505 may include a network interface controller (NIC) or a network adapter for communicating with an Ethernet or other wired-based network or a wireless NIC or wireless adapter for communications with a wireless network, such as a Wi-Fi network. In one embodiment, bus 506 includes any hardware, software, or both coupling components of a computer system 500 to each other.

The various embodiments of the present invention provide for the development of an exceptionally low cost, low power and extremely low profile component such as an ASIC which is to be made available for the inclusion in a parent device, such as the blender described above. The ASIC, or child component, will include both core services for inclusion of the parent device within the automation ecosystem along with extensible services made available to the parent device designer and/or manufacturer for integration to the range of functionality and configurations associated with the parent device. Moreover, the embodiments include the development of a hierarchal class system for establishing definitions of behavior, operation and modification for any parent device, the development of a UI model for dynamic awareness of end point existence and operation, and the development of a management layer, not to obfuscate and insulate the end user from the end point but rather to maintain concurrency of environment awareness and simplify process for variable device access. The core services introduced with the operating system present modes of access and interpretation the management application for interoperability with any device that includes an ASIC in accordance with the present invention.

Any conceivable permutation of any device, known or unknown, can be accommodated by the third party submission model made possible through the advent of the embodiments incorporating the above described FDK system and method. Management and control of any component within the ecosystem is manifest through a homogeneous approach made possible through a combination of data sets submitted within the FDK work-product along with defined parameters established within the class system contained within the logic of the imbedded element.

The various embodiments of the invention also offer revenue opportunities, including but not limited to: a licensing model for the distribution of the FDK, a commercialized goods sale made possible by Build-To-Order manufacturing and distribution of the imbedded element, such as an ASIC, a royalty model for the proliferation of the imbedded element, a professional services revenue system established for support and guidance of FDK use, and a commercial goods sales and licensing model for the deployment of the management system. The embodiments of the invention thus become both a super vertically and super horizontally integrated technology piece that may penetrate every industrial sector and enter into every manufactured construct or device that employs integrated circuits.

While particular embodiments of the present invention have been described, it is understood that various different modifications within the scope and spirit of the invention are possible. The invention is limited only by the scope of the appended claims.

I claim:

1. A computer implemented method for designing an integrated circuit which controls a device when the integrated circuit integrated into the device comprising:
   receiving a selection of categorized input and output characteristics of an electronic device into a memory of a processor programmed by software commands to design a hardware integrated circuit and associated operating software for controlling the integrated circuit to control the electronic device;
   analyzing by the processor the selection of categorized input and output characteristics of the electronic device;
   outputting by the processor of a hardware integrated circuit design based on the selection of input and output characteristics of the device; and
   outputting by the processor software programming commands to be executed by the hardware integrated circuit for controlling the electronic device in accordance with the selection of categorized input and output characteristics of the electronic device.

2. The method of claim 1, wherein outputting software for controlling the device includes providing a user interface and virtual controls for a controller which allows for controlling the device through the hardware integrated circuit.

3. The method of claim 2, wherein the user interface is based on the selection of input and output characteristics.

4. The method of claim 1, wherein the hardware integrated circuit allows for status input from the device and is capable of reporting the status to a controller.

5. The method of claim 1, wherein the hardware integrated circuit design is based on at least one predetermined hardware integrated circuit component which is able to control one of the input or output characteristics.

6. The method of claim 5, wherein the hardware integrated circuit design is provided as a software schematic, layout, or both.

7. The method of claim 1, wherein the hardware integrated circuit is configured by the software programming commands to communicate an identity and an operating state of the device to a controller and wherein the controller is configured to register the identity of the device, and based on the identity of the device, communicate control commands to the device to alter the operating state of the device.

8. A system comprising:
one or more processors;
logic encoded in one or more non-transitory computer-readable media that, when executed by the one or more processors, is operable to:
receive a selection of categorized input and output characteristics of a device;
into a memory associated with the one or more processors, the logic executed by the one or more processors operable to design a hardware integrated circuit design based on the selection of input and output characteristics of the device, the hardware integrated circuit design including a communication bus, and
output software programming commands to executed by the hardware integrated circuit for controlling the device in accordance with the selection of categorized input and output characteristics of the device using a communication protocol compatible with the device through the communication bus of the hardware integrated circuit.

9. The system of claim 8, wherein the provided hardware integrated circuit design includes:
a user interface for communicating with a controller which provides a virtual control for the device through the hardware integrated circuit.

10. The system of claim 9, wherein the user interface is based on the selection of input and output characteristics.

11. The system of claim 9, wherein the hardware integrated circuit includes an input for receiving status information from the device through the communication bus of the hardware integrated circuit, the status information representing an operating state of the device, and the hardware integrated circuit is configured by the software programming commands to communicate the status information to the controller through the communication bus of the hardware integrated circuit using the compatible communication protocol.

12. The system of claim 9, wherein the hardware integrated circuit design is based on at least one predetermined hardware integrated circuit component which is able to control one of the input or output characteristics.

13. The system of claim 12, wherein the hardware integrated circuit design is provided as a software schematic, layout, or both.

14. The system of claim 8, wherein the one or more non-transitory computer-readable media further comprises logic that, when executed by the one or more processors, is further operable to simulate the hardware integrated circuit's functionality based on the hardware integrated circuit design.

* * * * *